United States Patent [19]

Sturm

[11] 4,120,392
[45] Oct. 17, 1978

[54] COIL SPRING FEEDING APPARATUS

[75] Inventor: Helmut Sturm, Kenosha, Wis.

[73] Assignee: Frank L. Wells Company, Kenosha, Wis.

[21] Appl. No.: 768,065

[22] Filed: Feb. 14, 1977

Related U.S. Application Data

[63] Continuation-in-part of Ser. No. 545,095, Jan. 29, 1975, Pat. No. 4,050,610.

[51] Int. Cl.² .................... B65G 15/20; B65G 47/10
[52] U.S. Cl. .................................. 198/451; 198/486; 198/491; 198/600; 221/201; 221/298
[58] Field of Search .............. 221/210, 212, 171, 200, 221/201, 253, 298; 198/600, 486, 491, 451

[56] References Cited

U.S. PATENT DOCUMENTS

| 3,193,136 | 7/1965 | Stumpf et al. | 221/210 X |
| 3,441,064 | 4/1969 | Fischer et al. | 221/210 X |
| 3,621,971 | 11/1971 | Daniels et al. | 198/600 X |

Primary Examiner—Robert B. Reeves
Assistant Examiner—Francis J. Bartuska
Attorney, Agent, or Firm—Michael, Best & Friedrich

[57] ABSTRACT

Disclosed herein is a coil spring feeding apparatus comprising a plurality of elongated magazines supported by a frame in parallel relation to each other and each including a bottom and a discharge end, a conveyor assembly extending transversely of and adjacent to the discharge ends of the magazines for receiving the endmost coil springs from the magazines and for transporting the coil springs transversely of and away from the magazine ends, which conveyor includes a pair of spaced, parallel endless belts each having a top surface and supported for intermittent travel transversely of the magazine ends, an elongated platform having and upper surface, a cylinder for locating the platform, during belt movements, in a lower position with the platform upper surface beneath the belt top surfaces, and for locating the platform between belt movements, in a raised position, and a transfer device for withdrawing the endmost coil springs from the magazines and for transferring the endmost coil springs onto the conveyor assembly between belt movements.

6 Claims, 3 Drawing Figures

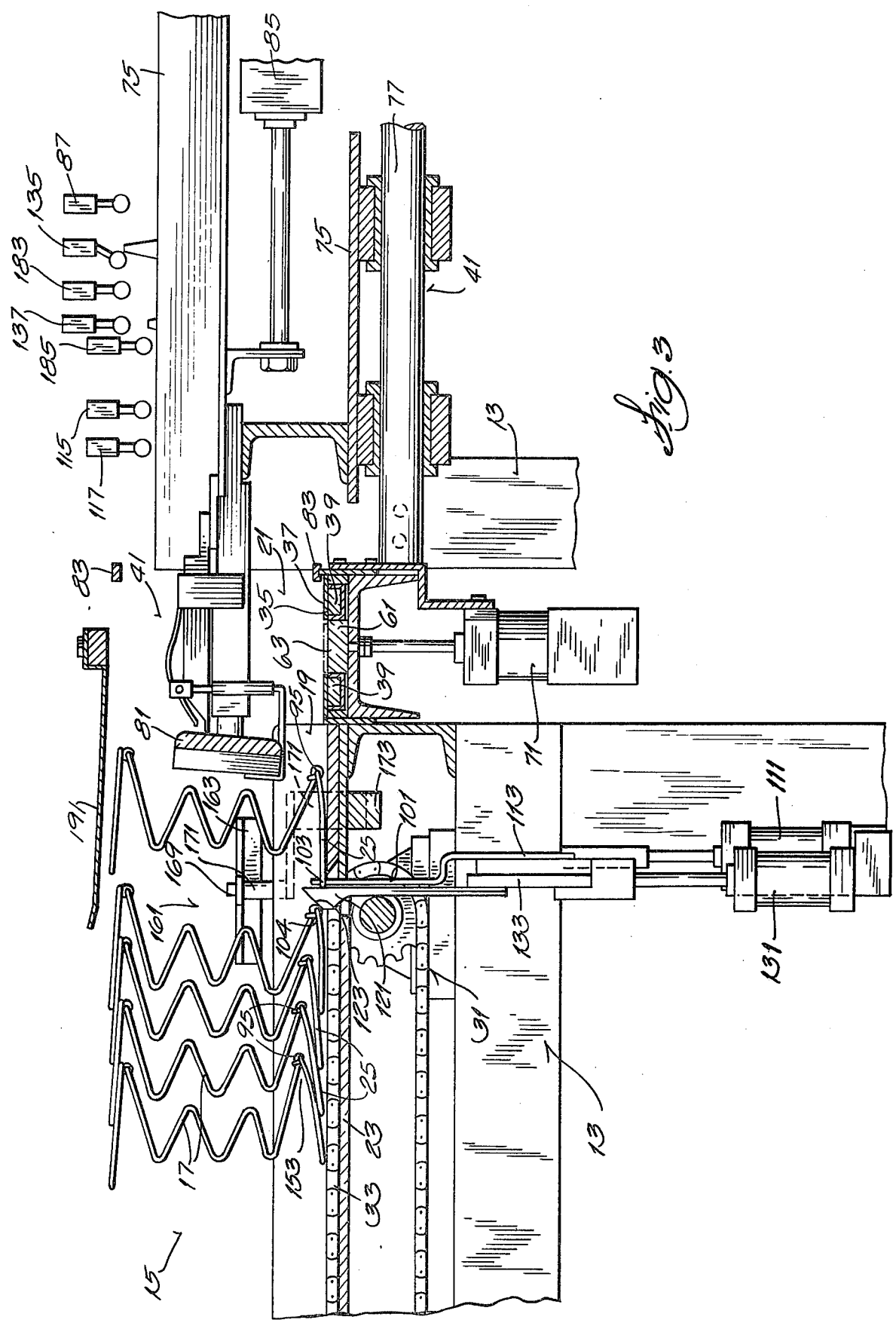

COIL SPRING FEEDING APPARATUS

RELATED INVENTION

This invention is a continuation in part application of my prior application Ser. No. 545,095 filed Jan. 29, 1975 now U.S. Pat. No. 4,050,610 and entitled "Coil Spring Feeding Apparatus". The disclosure of my prior application is incorporated herein by reference.

BACKGROUND OF THE INVENTION

The invention relates generally to coil spring feeding apparatus and more particularly to apparatus for withdrawing coil springs from a plurality of magazines mounted in parallel relation to each other and for transferring such withdrawn coil springs onto an intermittently advancing conveyor which transports the withdrawn coil springs from the magazines at a desired spacing from each other for delivery to additional mechanisms for integrating the coil springs into a spring fabric or assembly.

SUMMARY OF THE INVENTION

The invention provides coil spring feeding apparatus comprising an elongated magazine supported by a frame and including a bottom and a discharge end, which magazine is adapted to contain a plurality of coil springs each having a lowermost coil and arranged in axially upright position and in internested relation to each other lengthwise of the magazine with the lowermost coil of each coil spring at least partially overlying the lowermost coil of the adjacent coil spring located in the direction toward the magazine discharge end and with each lowermost coil having a part located remotely from the magazine discharge end, together with means engageable with the coil springs toward the magazine discharge end, first means enterable into the magazine through the bottom thereof and in advance of the remotely located part of the lowermost coil of the endmost coil spring adjacent to the discharge end for engaging the endmost coil spring part to stop further movement of the endmost coil spring toward the magazine discharge end, and second means enterable into the magazine through the bottom between the remotely located part of the lowermost coil of the endmost coil spring and the remotely located part of the lowermost coil of the next adjacent coil spring for displacing the next adjacent coil spring in the directon away from the magazine discharge end.

The invention also provides a coil spring feeding apparatus comprising an elongated magazine supported on a frame and including a discharge end, which magazine is adapted for containing an internested series of axially upright coil springs, together with means on the frame engageable with the series of coil springs in the magazine for conveying the series of coil springs toward the magazine discharge end, and means adjacent the magazine discharge end and movable transversely of the length of the magazine for engaging at least one of the coil springs adjacent the magazine discharge end so as to jar the coil springs transversely of the magazine.

The invention also provides a coil spring feeding machine comprising a plurality of coil spring magazines, arranged on a frame in parallel relation to each other and each having a discharge end, which magazines are each adapted to contain a plurality of coil springs, together with a conveyor assembly extending transversely of and adjacent to the discharge ends of the magazines for receiving coil springs from the magazines and for transporting the coil springs transversely of and away from the magazine ends, which conveyor includes a pair of spaced, parallel endless belts each having a top surface, means for supporting the belts for travel transversely of the magazine ends, drive means for intermittently moving the belts transversely of the magazine ends, an elongated platform having an upper surface, means on the frame supporting the platform between the belts and for movement between a raised position with the platform upper surface generally coplanar with the belt top surfaces and a lower position with the platform upper surface beneath the belt top surfaces, and means for locating the platform in the lower position during belt movements and for locating the platform in the raised position between belt movements, and means for withdrawing the endmost coil springs from the magazine and for transferring the endmost coil springs onto the conveyor assembly between belt movements.

The invention also provides a coil spring feeding machine comprising a plurality of coil spring magazines arranged on a frame in parallel relation to each other and each having a discharge end, which magazines are each adapted to contain a plurality of coil springs, an intermittently moving conveyor supported by the frame transversely of and adjacent to the discharge ends of the magazines for receiving coil springs from the magazines and for transporting the coil springs transversely of and away from the magazine ends, means on the frame for withdrawing the endmost coil springs from the magazines and for transferring the endmost coil springs onto the conveyor between movements thereof, and means on the frame and extending over the magazine discharge ends for engaging the topmost coils of the coil springs to be transferred from the magazines to the conveyor so as to provide resistance to movement of the topmost coils toward the magazine discharge ends and thereby to assist in retaining the axis of the coil springs in vertical position.

One of the principal features of the invention is the provision of structure in a coil feeding apparatus which facilitates withdrawal of only a single coil from each magazine.

Another of the principal features of the invention is the provision of a conveyor including a platform which is located between two spaced parallel endless conveying belts and which is displaceable between a raised position in co-planar relation to the upper surface of the belts to facilitate loading onto the belts of coil springs traveling in a direction transverse to the belts and a lower position beneath the top surface of the belts to facilitate transport of the coil springs by reason of belt movement.

Another of the principal features of the invention is the provision of kicker means arranged and operated to move horizontally transversely of the magazines to jar the coil springs therein and thereby to substantially reduce or eliminate such entanglement between the coil springs as might otherwise interfere with or hinder proper withdrawal of coil springs from the magazines.

Still another of the principal features of the invention is the provision of a roof member supported by the frame in position over the magazine discharge ends for engaging the topmost coils of the coil springs to be transferred from the magazines to the conveyors so as to provide resistance to movement of such topmost coils toward the magazine discharge ends and thereby to assist in retaining or maintaining the coil spring axes in vertical position.

Other features and advantages of the embodiments of the invention will become known by reference to the following general description, claims and appended drawings.

THE DRAWINGS

FIG. 3 is an enlarged partially schematic, fragmentary cross sectional view of the coil spring feeding apparatus shown in FIG. 1.

Figure 1:
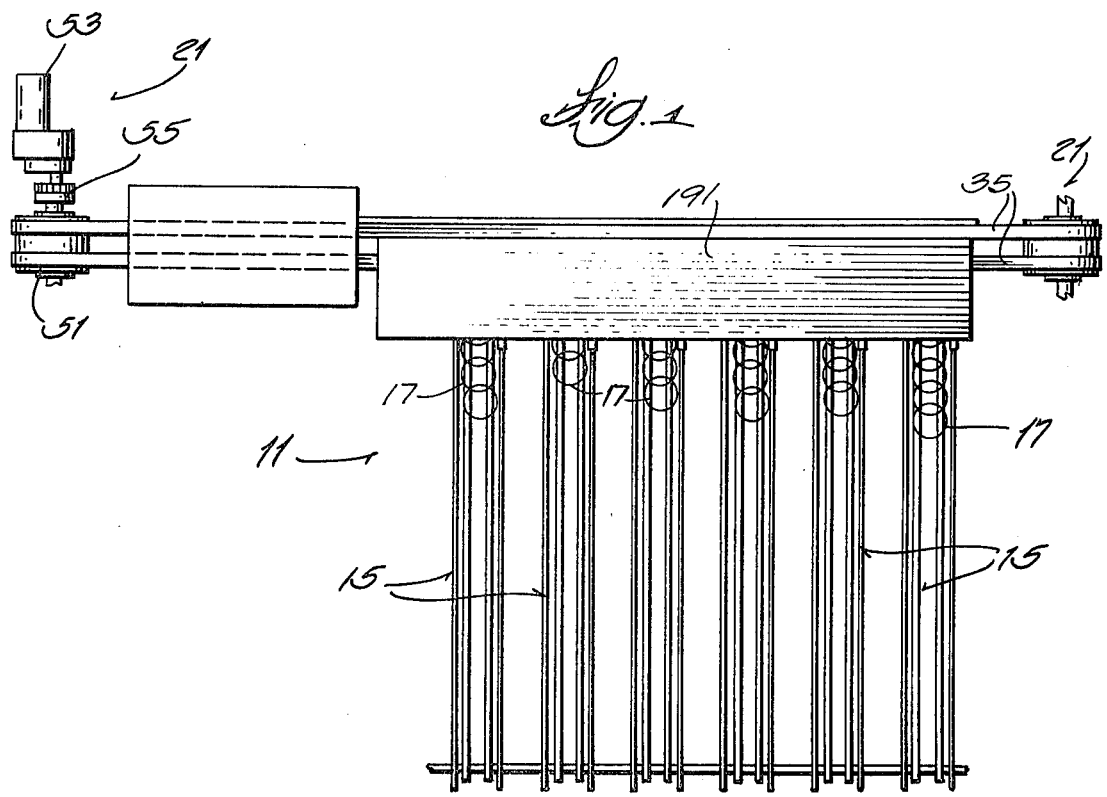
FIG. 1 is a partially schematic, top plan view of a coil spring feeding apparatus embodying various of the features of the invention.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a coil spring feeding apparatus 11 which embodies various of the features of the invention and which includes a supporting frame 13. Mounted on the frame 13 are a plurality of elongated magazines 15 which are arranged in parallel relation to each other, which are each adapted to receive a plurality or series of internested coil springs 17, and which respectively terminate in discharge ends 19 located adjacent to a transversely extending conveyor assembly 21. The magazines 15 are each generally of "U" shape in transverse cross section, including a bottom or floor 23 on which rests at least a part of the lowermost coil 25 of each coil spring 17, together with spaced side walls 27 and 29 projecting upwardly from the bottom or floor 23.

Means are provided, for each magazine, for engaging the coil springs 17 therein and for transporting or conveying the coil springs 17 toward the discharge ends 19 of the magazines 15. While various arrangements can be employed, in the illustrated construction, each magazine includes a chain conveyor 31 including a pair of transversely spaced endless chains 33 which, in part, form the magazine floor 23 and which are mounted and driven so that the upper run thereof engages the lowermost coil 25 of the coil springs 17 and conveys the coil springs 17 toward the magazine discharge ends 19.

The previously mentioned conveyor assembly 21 is mounted on the frame 13 adjacent the magazine discharge ends 19 and comprises a pair of endless, flexible belts 35, which include respective top surfaces 37 and which are respectively supported for movement transversely of and adjacent to the magazine discharge ends 19 by a pair of elongated fixed supports 39 on the frame 13 each of which includes a series of magnets to attract the coils to the belts 35.

Means are provided for intermittently advancing or moving the belts 35 in common with one another so as to transport coil springs 17 deposited thereon by a transfer mechanism or device 41 still to be described. While various arrangements can be employed, in the illustrated construction there is provided, at one end of the conveyor assembly 21, a drive sprocket or pulley 51 which drivingly engages the belts 35 and which is driven from a continuously operated electric drive motor 53 by an intermittently actuated clutch 55.

Located between the belts 35 and between the fixed supports 39 is a platform 61 which has an upper surface 63 and which is movable between a raised position in which the platform upper surface 63 is generally co-planar with the top surfaces 37 of the belts 35 and a lowered position wherein the upper surface 63 of the platform is depressed below the belt top surfaces 37.

Means are provided for moving the platform 61 between its raised and lowered positions. While various arrangements can be employed, in the illustrated construction, such means comprises one or more jointly acting two-way cylinders or rams 71 which operably extend between the frame 13 and the platform 61. Any suitable means (not shown) can be employed to guide movement of the platform 61 between its raised and lowered positions.

The transfer mechanism or device 41 comprises a sub-frame 75 movable on guides 77 supported by the frame 13 between an advanced position and a retracted position more remote from the magazine discharge ends 19 than the advanced position. Supported on the sub-frame 75 are a plurality of magnetic heads 81, one for each magazine 15, which heads 81 serve, when the sub-frame 75 is in the advanced position, to attract and engage the endmost coil spring in the associated magazine 15 and, in response to travel of the sub-frame 75 from the advanced to the retracted position, to withdraw the endmost coil spring from the associated magazine 15 and transport the withdrawn coil spring across the belts 35 and intervening platform 61. When the withdrawn coil springs are located with the bottommost or lowermost coils resting on the belts 35, the coil springs engage upper and lower stripper bars 83 which are supported by the frame 13 and which serve to disengage the withdrawn coil springs from the magnetic heads 81.

Any suitable means can be provided for moving the sub-frame 75 on the guides 77 between the advanced and retracted positions. In the illustrated construction, such means comprises one or more jointly acting two-way air or hydraulic cylinders or rams 85 which operably extend between the frame 13 and the sub-frame 75 and which can be operated by any suitable mechanism.

Means are provided for actuating the clutch 55 so as to disengage the belts 35 from the drive motor 53 during the period when the sub-frame 75 is moving toward and away from the advanced position and for engaging the clutch 55 to drive the belts 35 to transport the withdrawn coil springs transversely of the discharge magazine ends 19 when the sub-frame 75 is in the retracted position. While various arrangements can be employed, in the illustrated construction, such means comprises a micro-switch 87 mounted on the frame 13 in the path of sub-frame movement and operable to alternately effect engagement of the clutch 55 as the sub-frame 75 travels along the guides in the direction from the advanced position and to effect disengagement of the clutch 55 as the sub-frame travels toward the advanced position.

Means are provided for actuating the cylinder or cylinders 71 to raise and lower the platform 61 in accordance with the presence or absence of belt movement. While various arrangements can be employed, in the illustrated construction, such means comprises utilization of the micro-switch 87 so as also to actuate the cylinder or cylinders 71 to elevate the platform 61 to the raised position during the period between belt movements, thereby to facilitate travel of the withdrawn end springs across the conveyor assembly by locating the belt top surfaces 37 and the platform upper surfaces 63 in coplanar relationship, and to lower the platform 61 during belt movement, and thereby remove any restriction to movement of the withdrawn coil springs 17 by the belts 35 as a consequence of engagement of the coil springs 17 with the upper surface 63 of the platform 61.

Means are provided for preventing withdrawal of more than the endmost coil springs from each magazine 15 during movement of the transfer mechanism sub-frame 75 from the advanced position to the retracted position and for properly orienting the coil spring knot 95 prior to withdrawal of the endmost coil spring from each magazine 15.

In regard to preventing withdrawal of more than the endmost coil spring, each magazine 15 is provided with a means, in the form of a post or pin 101, which is enterable into the magazine 15 through the floor 23 thereof, and into position to temporarily intercept or engage that part or portion 103 of the lowermost coil 25 of the endmost coil spring, which part 103 is most remote from the magazine discharge end 19 and thereby to temporarily prevent further movement of the coil springs 17 toward the magazine discharge end 19 and thereby also to properly locate the endmost coil spring for engagement by the associated magnetic head 81 of the transfer mechanism 41.

Means are provided for displacing the pins 101 through the magazine floors 23 between raised positions within the magazines 15 and lowered or retracted positions below the magazines 15. While various arrangements can be employed, in the illustrated construction, such means comprises one or more jointly acting two-way air or hydraulic cylinders on rams 111 which operably extend between the frame 13 and a transverse member 113 located below the magazine 15 and connected to the pins 101 associated with all of the magazines 15.

Suitable means (not shown), can be mounted on the frame 13 to guide movement of the pins 101 between the raised and lowered or retracted positions.

Means are provided for actuating the cylinder or cylinders 111 to raise and retract the pins 101. While various arrangements can be employed, in the illustrated construction, such means comprises a micro-switch 115 which is supported on the frame 13 in position for actuation by the sub-frame 75 in response to movement thereof toward the advanced position and which is operative to cause the cylinder or cylinders 111 to raise the pins 101 during movement of the sub-frame 75 from the retracted position and prior to arrival of the sub-frame 75 at the advanced position. In addition, another micro-switch 117 is mounted on the frame 13 in position for actuation in response to sub-frame movement so as to cause withdrawal of the pins 101 from the magazines 15 as the sub-frame 75 reaches the advanced position.

The means for preventing withdrawal of more than the endmost of the coil springs 17 also includes, for each magazine 15, a discriminator or element 121 which is enterable into the magazines 15 through the floor 23 thereof and which is adapted to penetrate into the nested series of coil springs 17 between the part 103 of the lowermost coil of the endmost coil springs and the adjacent part 104 of the next adjacent coil spring, and to cause the next adjacent coil spring to be displaced rearwardly, i.e., in the direction away from the magazine discharge end 19. In this last regard, the discriminator 121 has a thickness in the direction of the length of the magazine 15 several times the width of the wire from which the coil springs 17 are fabricated and of sufficient distance to separate the endmost and next adjacent coil springs from each other to accomodate proper withdrawal of the endmost coil spring from the magazine 15. In this last regard, the discriminator 121 is wedge shaped at the upper end thereof to provide an inclined surface 123 which extends upwardly and toward the magazine discharge end 19, which inclined surface 123, as it moves upwardly, serves to cam the adjacent coil spring rearwardly.

Means are provided for moving the discriminators 121 between raised positions within the magazines 15 and lowered or retracted positions below the magazines 15. While various arrangements can be employed, in the illustrated construction, such means comprises one or more jointly acting two-way air or hydraulic cylinders or rams 131 which operably extend between the frame 13 and a transverse member 133 located below the magazines 15 and connected to the discriminators 121 associated with all of the magazines 15. Suitable means (not shown) can be mounted on the frame 13 to guide movement of the discriminators 121 between the raised and lowered or retracted positions.

Means are provided for actuating the cylinder or cylinders 131 to raise and lower the discriminators 121. While various arrangements can be employed, in the illustrated construction, such means comprises a micro-switch 135 mounted on the frame 13 in the path of movement of the sub-frame 75 for actuation thereby prior to arrival of the sub-frame 75 in the advanced position so as to cause the discriminators 121 to be displaced to the raised positions, thereby rearwardly moving, in each magazine 15, the coil spring adjacent to the endmost coil spring which is magnetically attracted to the transfer mechanism 41 as the sub-frame 75 reaches the advanced position. In addition, another micro-switch 137 is mounted on the frame 13 in the path of sub-frame movement for actuation thereby to cause retraction of the discriminators 121 to the lowered position beneath the magazines 15 subsequent to initiation of movement of the sub-frame 75 from the advanced position, i.e., after withdrawal of the endmost coil springs from the magazine discharge ends 19.

The means for orienting the knot 95 completing the lowermost coil 25 of the coil springs 17 includes, in each magazine 15, a retainer bar 141 which is attached to the left side wall 27 adjacent the magazine discharge end 19 in spaced relation above the magazine floor 23 so as to retain thereunder the adjacent side portion of the lowermost coil 25 of one or more of the coil springs adjacent the magazine discharge end 19.

The mounting of the retainer bar 141 on the left side wall 27 of the magazine 15 is such as to permit replacement thereof with retainer bars of differing shapes and sizes to accomodate coil springs 17 with differing convolutions.

Figure 2:
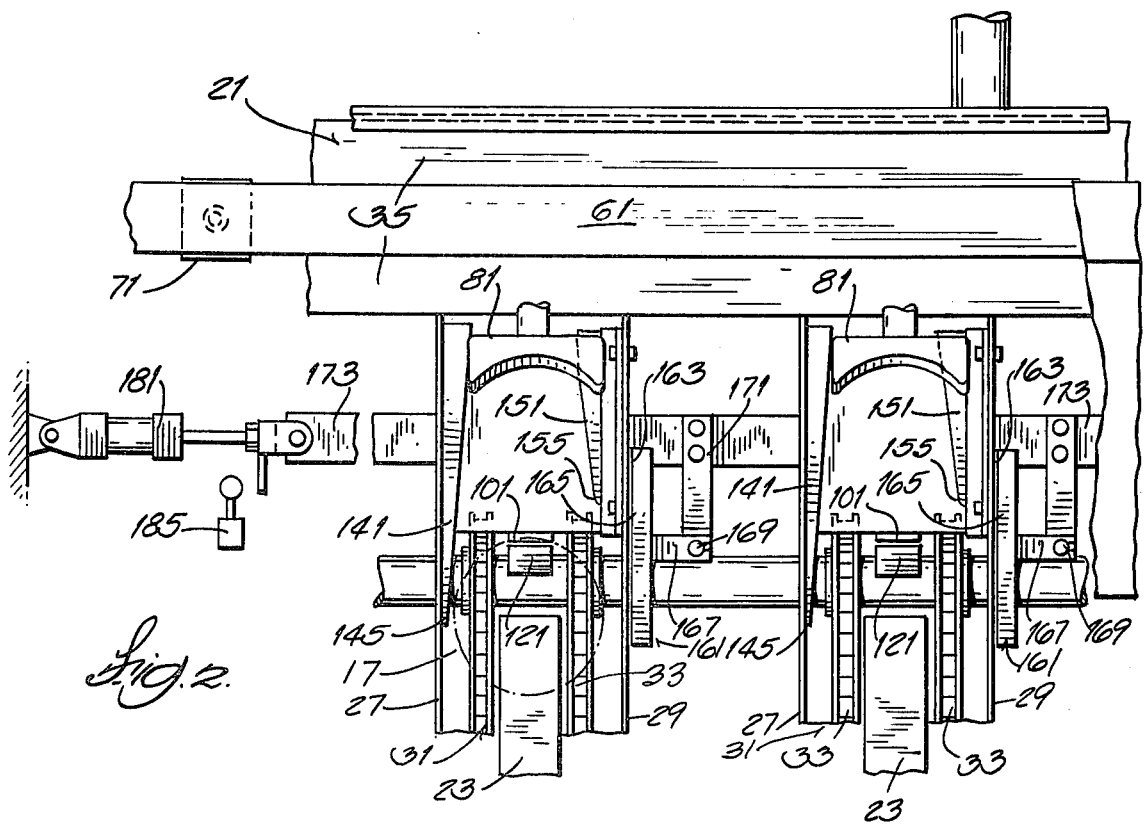
FIG. 2 is an enlarged partially schematic, fragmentary top view of a portion of the coil spring feeding apparatus shown in FIG. 1.

Preferably, as shown in FIG. 2, the retainer bar end 143, remote from the magazine discharge end 19, tapers toward a narrow edge 145. The height of the retainer bar 141 and its increasing thickness in the direction toward the magazine discharge end 19 facilitate engagement by the retainer bar 141 of the spiraling convolution of the coil spring above the lowermost coil 25. Because the wire moves progressively axially inwardly as it spirals upwardly, engagement of the coil spring by the retainer bar 141 causes rotation of the coil spring 17 in the clockwise direction and assists in providing cooperation between the coil spring 17 and the blade 151 next to be described so as to properly locate the knot 95.

Adjustably fixed to the first side wall 29 of each magazine 15, adjacent the discharge end 19 thereof, is a blade 151 which is spaced from the magazine floor 23, which extends downwardly and toward the magazine discharge end 19 and which is adapted to enter into the bite 153 between the lowermost coil 23 and the convolution extending upwardly from the knot 95. In addition, the blade end 155 most remote from the magazine discharge end 19 is curved outwardly toward the right side wall 29 of the magazine 15, thereby facilitating entry of the blade 151 into the bite 153 as the spring coils 17 move toward the discharge end 19 of the magazine 15.

The adjustable mounting of the blade 151 permits adjustment thereof to suit coil springs 17 of differing dimensions and substitution of different blade constructions if the dimensional variation between coil springs is sufficiently large.

Means are also provided, in each magazine 15, for "kicking" one or more of the coil springs 17 in the magazine 15 adjacent the discharge end 19 thereof to reduce or eliminate such entanglement between the coil springs 17 as might otherwise interfere with or hinder operation of the pin 101, the discriminator 121, and the magnetic head 81. While various other arrangements can be employed, in the illustrated construction, each magazine 15 includes a kicker plate 161 which is displaceable transversely of the magazine discharge end 19 to engage one or more of the coil springs 17 and to thereby transversely jar the coil springs 17. In the illustrated construction, the kicker plate 161 comprises a length of angle iron which overlies the right side wall 29 of the magazine 15 and includes a leg 163 extending vertically downwardly into position for engagement with the coil springs 17, together with a leg 165 which extends horizontally from the upper end of the vertical leg 163 and which is welded to an arm 167. In turn, the arm 167 is adjustably fixed by reason of a bolt and slot connection 169 to a post 171 extending upwardly from a cross bar 173 which extends under all of the magazines 15 and serves as a common support for all of the kicker plates 161.

Means are provided for moving the kicker plates 161 horizontally transversely of the magazines 15 between retracted positions clear of the coil springs 17 and positions engaging the coil springs 17 to jar the coil springs 17. While various arrangements can be employed, in the illustrated construction, such means comprises one or more jointly acting, two way air or hydraulic cylinders 181 which are operatively connected between the frame 73 and the cross bar 173 to cause transverse cross bar movement toward the coil springs 17 in response to pressurization of the cylinder 181. Various means (not shown) can be employed on the frame 13 to guide such transverse movement of the cross beam 173.

Means are provided for actuating the cylinder or cylinders 181 to transversely move the cross bar 173 and the kicker plates 161 carried thereon. While various arrangements can be employed, in the illustrated construction, such means comprises a micro-switch 183 which is supported by the frame 13 in the path of movement of the transfer mechanism sub-frame 75 so as to actuate the cylinder or cylinders 181 to cause movement of the kicker plates 161 to engage and jar the coil springs 17 just prior to raising of the pins 101. In addition, a second micro-switch 185 is supported on the frame 13 in the path of movement of the cross bar 173 so as to actuate the cylinder or cylinders 181 to effect return movement of the cross bar 173 as the kicker plates reach their maximum insertion into the magazines. Additional micro-switches (not shown) can also be located on the frame 13 in position for engagement by the transfer mechanism sub-frame 75 so as to actuate the kicker plates 161 to strike and jar the coil springs 17 at additional times.

Means are provided in order to counter any tendancy of the coil springs 17 adjacent the magazine discharge ends 19 toward leaning of the tops of the coil springs 17 toward the magazine discharge ends 19 and thereby to facilitate proper engagement of the endmost coil springs with the magnetic heads 81. In order to prevent such leaning, means in the form of a roof member 191 is supported by the frame 13 in overlying relation to the discharge ends 19 of the magazines 15 to engage the topmost coils of the coil springs 17 to be transferred and thereby to provide resistance to movement of the topmost coils toward the magazine discharge ends 17 so as thereby to assist in maintaining the axes of the coil springs 17 in vertical orientation. In the illustrated construction, the roof member 191 is slightly inclined upwardly and away from the magazine discharge ends 19 so as to effect slight but increasing resistance to movement as the spring coils 17 move toward the magazine discharge ends 19 and thereby assist in maintaining the axes of the coil springs 17 in vertical orientation.

Various of the features of the invention are set forth in the following claims.

What is claimed is:

1. A coil spring feeding apparatus comprising a frame, a plurality of elongated magazines supported by said frame, each magazine including a bottom and a discharge end, said magazines each being adapted to contain a plurality of coil springs each having a lowermost coil and arranged in axially upright position and in internested relation to each other lengthwise of said magazine with the lowermost coil of each coil spring at least partially overlying the lowermost coil of the adjacent coil spring located in the direction toward said magazine discharge end and with each lowermost coil having a part located remotely from said magazine discharge end, means engageable with the coil springs in said magazines for conveying the coil springs toward said magazine discharge ends, first means enterable into each of said magazines through said bottom thereof and in advance of the remotely located part of the lowermost coil of the endmost coil spring adjacent to said discharge end for engaging the endmost coil spring part to stop further movement of the endmost coil spring toward said magazine discharge end, second means enterable into each of said magazines through said bottom between the remotely located part of the lowermost coil of the endmost coil spring and the remotely located part of the lowermost coil of the next adjacent coil spring for displacing the next adjacent coil spring in the direction away from said magazine discharge ends, a conveyor supported by said frame transversely of and adjacent to said discharge ends of said magazines for receiving coil springs from said magazines and for transporting said coil springs transversely of and away from said magazine ends, said conveyor means including a pair of spaced, parallel endless belts each having a top surface, means for supporting said belts for travel transversely of said magazine ends, drive means for intermittently moving said belts transversely of said magazine ends, an elongated platform having an upper surface, means on said frame supporting said platform between said belts and for movement between a raised position with said platform upper surface generally coplanar with said belt top surfaces and a lower position with said platform upper surface beneath said belt top surfaces, and means for locating said platform in said lower position during belt movements and for locating said platform in said raised position between belt movements, and means for withdrawing the endmost coil springs from said magazines and for transferring the the endmost coil springs onto said conveyor means, between belt movements.

2. A coil spring feeding apparatus in accordance with claim 1 and further including means adjacent each of said magazine discharge ends and movable transversely of the magazine length for engaging at least one of the coil springs in each magazine adjacent said magazine discharge ends so as to jar the coil springs transversely of said magazines.

3. A coil spring feeding apparatus in accordance with claim 1 and further including means on said frame and extending over said magazine discharge ends for engaging the topmost coils of the coil springs to be transferred from said magazines to said conveyor means so as to provide resistance to movement of the topmost coils toward said magazine discharge ends and thereby to assist in retaining the axes of the coil springs in vertical position.

4. A coil spring feeding apparatus comprising a frame, a plurality of coil spring magazines arranged on said frame in parallel relation to each other and each having a discharge end, said magazines each being adapted to contain a plurality of coil springs, a conveyor assembly extending transversely of and adjacent to said discharge ends of said magazines for receiving coil springs from said magazines and for transporting the coil springs transversely of and away from said magazine ends, said conveyor including a pair of spaced, parallel endless belts each having a top surface, means for supporting said belts for travel transversely of said magazine ends, drive means for intermittently moving said belts transversely of said magazine ends, an elongated platform having an upper surface, means on said frame supporting said platform between said belts and for movement between a raised position with said platform upper surface generally coplanar with said belt top surfaces and a lower position with said platform upper surface beneath said belt top surfaces, and means for locating said platform in said lower position during belt movements and for locating said platform in said raised position between belt movements, and means for withdrawing the endmost coil springs from said magazines and for transferring the endmost coil springs onto said conveyor assembly between belt movements.

5. A coil spring feeding apparatus in accordance with claim 4 and further including means adjacent said magazine discharge end and movable transversely of the length of said magazine for engaging at least one of the coil springs, in each magazine, adjacent said magazine discharge ends so as to jar the coil springs transversely of said magazines.

6. A coil spring feeding apparatus in accordance with claim 4 and further including means on said frame and extending over said magazine discharge ends for engaging the topmost coils of the coil springs to be transferred from said magazines to said conveyor assembly so as to provide resistance to movement of the topmost coils toward said magazine discharge ends and thereby to assist in retaining the axes of the coil springs in vertical position.

* * * * *